US008090533B2

United States Patent
Koike et al.

(10) Patent No.: US 8,090,533 B2
(45) Date of Patent: Jan. 3, 2012

(54) MAP DISPLAY SYSTEM, METHOD OF INPUTTING CONDITIONS FOR SEARCHING FOR POI, METHOD OF DISPLAYING GUIDANCE TO POI, AND TERMINAL DEVICE

(75) Inventors: Tadanori Koike, Tokyo (JP); Hiroshi Sakamoto, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 653 days.

(21) Appl. No.: 12/280,626

(22) PCT Filed: Feb. 27, 2006

(86) PCT No.: PCT/JP2006/303650
§ 371 (c)(1),
(2), (4) Date: Aug. 25, 2008

(87) PCT Pub. No.: WO2007/097037
PCT Pub. Date: Aug. 30, 2007

(65) Prior Publication Data
US 2009/0037101 A1 Feb. 5, 2009

(51) Int. Cl.
*G09B 29/00* (2006.01)
*G01C 21/00* (2006.01)
*G06F 17/30* (2006.01)
(52) U.S. Cl. ......... 701/209; 701/206; 701/211; 715/810
(58) Field of Classification Search .................. 701/209, 701/201, 210, 211, 206; 715/810, 808, 835, 715/851, 859
See application file for complete search history.

(56) References Cited

U.S. PATENT DOCUMENTS

| 7,715,981 B2* | 5/2010 | Bradley et al. ................ 701/209 |
| 7,840,345 B2* | 11/2010 | Miyoshi ........................ 701/208 |
| 2002/0047787 A1* | 4/2002 | Mikkola et al. ............... 340/995 |
| 2002/0130906 A1* | 9/2002 | Miyaki ........................... 345/837 |
| 2008/0288545 A1* | 11/2008 | Hegedus et al. ........... 707/104.1 |

FOREIGN PATENT DOCUMENTS

| JP | 11-184882 A | 7/1999 |
| JP | 2001-165681 A | 6/2001 |
| JP | 2002-099816 A | 4/2002 |
| JP | 2002-236696 A | 8/2002 |

(Continued)

OTHER PUBLICATIONS

S. Izumi et al.; "Visualizing Barrier-free Accessibility in Facilities with 3D Spatial Map"; IPSJ SIG Technical Report, No. 121, pp. 97-102, Nov. 27, 2004.

(Continued)

*Primary Examiner* — Tan Q Nguyen
(74) *Attorney, Agent, or Firm* — Westerman, Hattori, Daniels & Adrian, LLP

(57) ABSTRACT

A map display system has a terminal device having display means for displaying a map image and also has a route search server having a POI database. The map display system has operation/input means for performing predetermined operation on an object image including a POI category or POI information, object image operation detection means for detecting operation on the object image, and POI search means for extracting the POI category or the POI information from the operated object image and searching for a POI while referring to the POI database. The display means displays on a map image the POI searched by the POI search means.

26 Claims, 12 Drawing Sheets

FOREIGN PATENT DOCUMENTS

| | | |
|---|---|---|
| JP | 2002-340588 A | 11/2002 |
| JP | 3354851 B2 | 12/2002 |
| JP | 2003-132483 A | 5/2003 |
| JP | 2003-150475 A | 5/2003 |
| JP | 2003-227722 A | 8/2003 |

OTHER PUBLICATIONS

International Search Report of PCT/JP2006/303650, date of mailing May 23, 2006.

Notification of Transmittal of Translation of the International Preliminary Report on Patentability (Form PCT/IB/338) of International Application No. PCT/JP2006/303650 mailed Sep. 12, 2008 with Forms PCT/IB/373, PCT/ISA/237, and PCT/IB/326.

Japanese Office Action dated Mar. 17, 2011, issued in corresponding Japanese Patent Application No. 2008-501587.

* cited by examiner

MAP DISPLAY SYSTEM, METHOD OF INPUTTING CONDITIONS FOR SEARCHING FOR POI, METHOD OF DISPLAYING GUIDANCE TO POI, AND TERMINAL DEVICE

TECHNICAL FIELD

The present invention relates to a navigation system that can search for a desired point of interest (POI) and provide route guidance to the point of interest thus searched. The present invention particularly relates to a navigation system that displays an object image for displaying a POI category for which searching is desired in the area of the map displayed on display means, and searches for a POI specified by the object image by using drag-and-drop on the map that has the object image displayed. The present invention also relates to a method of inputting search conditions in which a navigation system, a portable terminal device, and an object image are used, and to a method of displaying guidance so that route guidance to the position of the POI obtained by the search described above is displayed while the object image is continuously or intermittently moved.

BACKGROUND ART

Mobile phones and other portable terminals currently include a browser and are capable of accessing the Internet and receiving desired information. In such systems, the user operates a portable terminal, uses a search engine or the like provided to a server to find a desired website, downloads content of the website, and peruses content using the browser. The content includes information belonging to various categories, including shop and event information, train route timetables, railroad transfer guidance, and the like.

In relation to providing shop and event information, the user operates a portable terminal and inputs the category of the shop or event and the desired search region; the shops and events that correspond to the specified category in the corresponding region are searched; and the information is distributed to the portable terminal device. When a timetable is provided, the user operates the portable terminal and specifies a route, and the timetable of the route is displayed on the screen of the display device of the portable terminal. In the case of transfer guidance, the user specifies the departure location and the destination, whereby a recommended route is presented.

Information distribution servers have plentiful functions and are not limited to providing timetables and transfer guidance for rail and bus routes. There are also information distribution servers that provide functions of conventional car navigation systems to mobile phones and other portable terminals. In accordance with such systems, navigation service can be provided to car drivers as well as to pedestrians.

A mobile phone user can use a service such as that described above to obtain various desired information. For example, maps, business content, prices, business hours, and other information related to a point of interest (hereinafter referred to as POI) in which the user has interest can be obtained. A POI can be, e.g., a hotel, restaurant, department store, theme park, convenience store, gasoline stand, exercise facility, park, or another other shop or facility. For this reason, the types (categories) of POI are enormous, and there are innumerable shops and locations that belong to these categories. As the range that an information distribution service covers increases, the number of POIs also increases.

Therefore, the information distribution server is provided with a POI database in order to provide information related to these numerous POI to the user. In the POI database, the POI are divided into categories, and the POI categories are formed into a hierarchy of large, intermediate, and small classifications due to the numerous categories. The user selects a desired POI category from a menu screen displayed on the portable terminal and requests data from the information distribution server. The user moves through the hierarchy of large, intermediate, and small categories in order to select a specific desired POI, and selects a POI category for which information distribution is desired.

When the user desires the distribution of information related to a specific POI, it is ordinarily because the user has intention to patronize the POI. Therefore, the aim is generally to obtain information that the user desired in relation to the region and POI in the vicinity of the current location. Therefore, the selection of a POI category accompanies an operation for specifying the area in which the POI exists and the current location information.

When the portable terminal used by the user is a mobile phone, the current position of the terminal can be transmitted to an information distribution server by using the positioning function because modern mobile phones are provided with a GPS receiver and have a positioning function for receiving a signal from a GPS satellite and calculating the current position of the user. In the case of a portable terminal that can receive navigation service, a specific desired POI information is obtained, after which a route search from the current position, home, workplace, or another desired departure location to a specific POI can be received.

Various types of such POI information systems have been proposed. For example, a system disclosed as an "information distribution method" is known in Patent Document 1 (Japanese Laid-open Patent Application No. 2003-132483) described below.

The information distribution method disclosed in Patent Document 1 is a system composed of a mobile phone, which is an information distribution computer system and terminal device. When certain POI guidance information is requested from an external mobile phone, the information distribution computer system responds to a request origination by attaching a link to the desired POI guidance information in which the link information is the URL for a route search request made to a information distribution computer system having the POI position information and the optimal route information. When a link displayed together with the POI guidance information is selected using the mobile phone in this configuration, the route search conditions are automatically set in which the current position detected by the GPS receiver is used as the departure location, the POI position information is used as the destination, the time calculated by a timer is used as the planned departure time, and a route search request is made to an information distribution computer system in which the information of the route search conditions is attached.

In other words, when the information distribution computer system has a POI search request from a mobile phone, searches for a specific POI, and distributes POI guidance information (map, business description, or the like) to a mobile phone, the link information to the route search function is attached and distributed, and the mobile phone selects the link, whereupon a search is made for the best route from the current location to the POI.

Also known is a system disclosed as an "information providing system and method" in Patent Document 2 (Japanese Laid-open Patent Application No. 2003-150475) described below. The information providing system disclosed in Patent Document 2 is a system composed of a portable terminal and a web application server.

In this information providing system, the user using a portable terminal selects a service requested from a displayed provider service menu. The information of the selected service is transmitted to the web application server. A GPS satellite outputs position information. The portable terminal receives the position information, calculates a current position on the basis of the position information thus received, and transmits the information of the current position to the web application server via the Internet. The web application server receives the information of the current position transmitted from the portable terminal, and transmits to the portable terminal, information related to the current position, which is information related to the service selected by the user that uses the portable terminal.

There are also information distribution server systems in which distribution conditions that a user desires to have provided as information can be registered by the user in advance. Such a system is disclosed as an, e.g., "information distribution server, mobile terminal, and information distribution system" in Patent Document 3 (Japanese Laid-open Patent Application No. 2002-99816) described below.

The information distribution system disclosed in Patent Document 3 is a system composed of an information distribution server and a mobile terminal mounted in an automobile. The information distribution server in the information providing system has a distribution unit for distributing information to a mobile terminal, a position information acquisition unit for acquiring position information of the mobile terminal from the mobile terminal, and a storage unit for storing distribution area-specifying information for specifying a plurality of types of distribution information to be distributed to the mobile terminal and the distribution area for each type of distribution information, and distribution information-specifying information for specifying the type of distribution information requested by the mobile terminal, wherein the position corresponding to the position information acquired by position information acquisition means is included in the distribution area that corresponds to the distribution area-specifying information, and the distribution information is distributed to the mobile terminal when the type of distribution information is a type that corresponds to the distribution information-specifying information.

In other words, the information distribution system is a system configured so that the mobile terminal registers a specific POI for which information distribution is requested in advance from the information distribution server, and registers the area for which information distribution has been requested, and the information distribution server monitors the position of the mobile terminal and distributes the information related to the specified (registered) POI when the mobile terminal arrives in the registered area.

Also known is a system for searching a POI that is open for business in accordance with a time frame on the basis of the time at which a POI search request was made from the mobile terminal with consideration given to the business hours of each POI when information related to the POI is provided to the mobile device. For example, a "navigation device" is disclosed in Patent Document 4 (Japanese Patent No. 3354851).

The navigation device is provided with position detection means for detecting a position of vehicle, map information storage means in which map information is stored, and route search means for searching a route from a current position to a specified position and providing guidance, the navigation device being provided with facility data storage means in which data of the time frame and the service facility are correlated and stored by operation of the user; time frame detection means for detecting that the current time is within the storage time frame stored in the facility data storage means; facility selection means for selecting a service facility from among the service facilities that are stored in the facility data storage means in correlation with the storage time frame at the current time, when the current time is detected by the time frame detection means to be in the storage time frame; and facility search means for searching for a service facility that is nearest to the current position from the service facilities selected by the facility selection means.

A route search device and route search method used in a common navigation device and communication navigation system is disclosed in, e.g., Patent Document 5 (Japanese Laid-open Patent Application No. 2001-165681) described below. This navigation system is configured so as to send information from the portable navigation terminal about the departure location and the destination to the route search server, and to search for a route and provide guidance that matches the search conditions from road and traffic network data in the route search server. Examples of search conditions include the use of movement means from a departure location to a destination by walking, car, and a combination of railroad and walking, and these options may be subject to a route search as one of the search conditions.

The route search server is provided with the roads (routes) of map data as connection points, the position of directional change points as nodes, the routes connecting the nodes as links, and the cost information (distance and required time) of all links as a database. The route search server sequentially searches links from the node of the departure location to the node of a destination with reference to the database, and can provide guidance to the portable navigation terminal regard the shortest route by following nodes and links that produce the lowest cost information of the links and setting the result as the guidance route. A method referred to as the label determination method or the Dijkstra method is used as such a route search method. Also, a route search method using the Dijkstra method is disclosed in Patent Document 5 noted above.

In sightseeing areas and the like, guidance is often provided using a map display board. In this guidance, a map displayed on a map display board and a selection button for a sightseeing facility or lodging facility are provided, and a lamp is lighted on the map display board and the position is shown in accordance with the button of a POI that a tourist has pressed.

[Patent Reference 1]: Japanese Laid-open Patent Application No. 2003-132483 (FIG. 1, paragraph [0006])

[Patent Reference 2]: Japanese Laid-open Patent Application No. 2003-150475 (FIGS. 1 and 2, paragraph [0013])

[Patent Reference 3]: Japanese Laid-open Patent Application No. 2002-99816 (FIGS. 1 and 2, paragraphs [0034],

[Patent Reference 4]: Japanese Patent 3354851, Specification (FIG. 1, paragraph [0014])

[Patent Reference 5]: Japanese Laid-open Patent Application No. 2001-165681 (FIGS. 1 and 2)

DISCLOSURE OF THE INVENTION

Problems the Invention is Intended to Solve

As described above, the POI extends across many categories. Therefore, in an information distribution system such as that disclosed in Patent Document 1, the user must specify a POI category, an area to be searched, and other parameters that the user desires to search by inputting text from the search screen in order to search for a desired POI. Accordingly, there is a problem in that laborious operation involving text input is required for the POI categories that the user desires to search.

There is also a POI search method for selecting a POI category for which a search is desired from a list of POI categories displayed on a POI search menu screen. The POI categories are formed into a hierarchy of large classifications, intermediate classifications, small classifications, and other classifications due to the large number of categories, and the POI search menu screen is also formed into a hierarchy in accordance therewith. Therefore, there is a problem in that the user must perform laborious operation to select a desired POI category by following through the hierarchy of large, intermediate, and small categories in order to select a desired POI category (*1).

The inventors of the present invention, as a result of thoroughgoing research to solve the problems described above, contrived to solve the problems described above and perfected the present invention using a configuration in which an object image is displayed for representing POI categories for which a search is desired in the area of the map displayed on display means, and a POI specified by the object image is searched by dragging and dropping the object image on the map thus displayed.

The inventors also perfected the present invention having contrived a configuration in which the object image is displayed while being sequentially moved along a route to a POI thus searched, whereby a guidance route to the POI can be displayed to the user in an easily understood manner.

In other words, an object of the present invention is to solve the problems described above and to provide a navigation system, a portable terminal device, a method for inputting search conditions using an object image, and a method for displaying guidance, that can specify search conditions of a desired POI using a simple operation, and display in an easily understood manner a guidance route to a POI that has been searched.

Means for Solving the Abovementioned Problems

In order to solve the problems described above, part 1 of the present invention is a map display system composed of a terminal device having display means for displaying a map image, and a route search server having a POI database, the map display system characterized in that:

the map display system comprises operation and input means for performing a predetermined operation on an object image that includes a POI category or POI information;

object image operation detection means for detecting operation on the object image; and POI search means for extracting the POI category or POI information from the operated object image, referencing the POI database, and extracting a POI; and the display means displays the POI searched by the POI search means on the map image.

A second aspect of part 1 of the present invention is characterized in that:

the display means displays as an object image group an object image for each POI category adjacent to a display area in which the map image is displayed;

the operation and input means includes operation means for selecting, as the predetermined operation, the object image for which a search is desired from the object image group, and dropping the object image on the map image displayed on the display means; and the object image operation detection means detects operation on the object image with the aid of the operation means.

A third aspect of part 1 of the present invention is characterized in that:

the operation means for dropping the object image onto the map image displayed on the display means includes operation means for dragging and dropping the object image for which the search is desired; and the object image operation detection means detects operation on the object image with the aid of the operation means.

A fourth aspect of part 1 of the present invention is characterized in that:

the operation means has operation means for clicking the object image in order to set the number of POIs to be searched; and the object image operation detection means detects the number of clicks of the object image performed by the operation means.

A fifth aspect of part 1 of the present invention is characterized in that:

the object image is text or a pictograph; and the operation and input means includes operation means for selecting, as the predetermined operation, the object image for which a search is desired, and dropping the object image on the map image displayed on the display means.

A sixth aspect of part 1 of the present invention is characterized in that:

the operation means for dropping the object image onto the map image displayed on the display means includes operation means for copying and pasting the object image for which the search is desired; and the object image operation detection means detects operation on the object image performed by the operation means.

Part 2 of the present invention is a map display system composed of a terminal device having display means for displaying a map image, and a route search server having a POI database, the map display system characterized in that the map display system comprises:

operation and input means for performing a predetermined operation on an object image that includes a POI category or POI information;

object image operation detection means for detecting operation on the object image;

means for setting search starting point for determining the starting point of a route search;

POI search means for extracting the POI category or POI information from the operated object image, referencing the POI database, and searching for a POI; and route search means for searching for a route from a search starting point determined by the means for setting search starting point to the searched POI;

the object image on the map image being moved at a predetermined speed along the searched route from the search starting point to the searched POI, and the POI being displayed, on the display means.

A second aspect of part 2 of the present invention is characterized in that:

the display means displays as an object image group an object image for each POI category adjacent to a display area in which the map image is displayed;

the operation and input means includes operation means for selecting, as the predetermined operation, the object image for which a search is desired from the object image group, and dropping the object image on the map image displayed on the display means; and the object image operation detection means detects operation on the object image with the aid of the operation means.

A third aspect of part 2 of the present invention is characterized in that:

the operation means for dropping the object image onto the map image displayed on the display means includes operation means for dragging and dropping the object image for which the search is desired; and the object image operation detection means detects operation on the object image with the aid of the operation means.

A fourth aspect of part 2 of the present invention is characterized in that:

the operation means has operation means for clicking the object image in order to set the number of POIs to be searched; and the object image operation detection means detects the number of clicks of the object image performed by the operation means.

A fifth aspect of part 2 of the present invention is characterized in that: the object image is text or a pictograph; and the operation and input means includes operation means for selecting, as the predetermined operation, the object image for which a search is desired, and dropping the object image on the map image displayed on the display means.

A sixth aspect of part 2 of the present invention is characterized in that:

the operation means for dropping the object image onto the map image displayed on the display means includes operation means for copying and pasting the object image for which the search is desired; and the object image operation detection means detects operation on the object image performed by the operation means.

A seventh aspect of part 2 of the present invention is characterized in that:

the means for setting search starting point determines as the search starting point the coordinate on the map screen where the object image is dropped.

An eighth aspect of part 2 of the present invention is characterized in that:

the map display system further comprises positioning means for positioning the current location; and the means for setting search starting point determines as the search starting point the center coordinate of the map image displayed on the display means, or the current location positioned by the positioning means.

Part 3 of the present invention is a method for inputting a POI search condition in a map display system composed of a terminal device having display means for displaying a map image, and a route search server having a POI database; the method characterized in that:

the map display system has operation and input means for performing a predetermined operation on an object image that includes a POI category or POI information; object image operation detection means for detecting operation on the object image; and POI search means for extracting the POI category or POI information from the operated object image, referencing the POI database, and searching for a POI; the method comprising:

a first step for detecting that the object image operation detection means has performed a predetermined operation on the object image with the aid of the operation and input means;

a second step in which the POI search means extracts a POI category or POI information from the operated object image;

a third step for searching for an applicable POI with reference to the POI database; and a fourth step for displaying the POI searched by the POI search means on the map image displayed on the display means.

A second aspect of part 3 of the present invention is characterized in that:

the display means displays as an object image group an object image for each POI category adjacent to a display area in which the map image is displayed;

the operation and input means includes operation means for selecting, as the predetermined operation, the object image for which a search is desired from the object image group, and dropping the object image on the map image displayed on the display means; and the first step includes a process for detecting operation on the object image with the aid of the operation means.

A third aspect of part 3 of the present invention is characterized in that:

the operation means for dropping the object image onto the map image displayed on the display means includes operation means for dragging and dropping the object image for which the search is desired; and the first step includes a process for detecting operation on the object image with the aid of the operation means.

A fourth aspect of part 3 of the present invention is characterized in that:

the operation means has operation means for clicking the object image in order to set the number of POIs to be searched;

and the first step includes a process for detecting the number of clicks of the object image performed by the operation means.

A fifth aspect of part 3 of the present invention is characterized in that:

the object image is text or a pictograph;

the operation and input means includes operation means for selecting, as the predetermined operation, the object image for which a search is desired, and dropping the object image on the map image displayed on the display means; and the first step includes a process for detecting operation on the object image.

A sixth aspect of part 3 of the present invention is characterized in that:

the operation means for dropping the object image onto the map image displayed on the display means includes operation means for copying and pasting the object image for which the search is desired; and the first step detects operation on the object image performed by the operation means.

Part 4 of the present invention is a method for displaying guidance to a POI in a map display system composed of a terminal device having display means for displaying a map image, and a route search server having a POI database; [the method] characterized in that:

the map display system comprises operation and input means for performing a predetermined operation on an object image that includes a POI category or POI information; object image operation detection means for detecting operation on the object image; means for setting search starting point for determining a starting point of a route search; POI search means extracting the POI category or POI information from the operated object image, referencing the POI database, and searching for a POI; and route search means for searching for a route from a search starting point determined by the means for setting search starting point to the searched POI; [the method] comprising:

a first step for detecting that the object image operation detection means has performed a predetermined operation on the object image with the aid of the operation and input means;

a second step for extracting a POI category or POI information from the operated object image;

a third step for searching for an applicable POI with reference to the POI database;

a fourth step in which the route search means searches for a route from a search starting point determined by the means for setting search starting point to the searched POI; and a fifth step for moving the object image at a predetermined speed along the searched route from the search starting point to the searched POI on the map image displayed on the display means, and displaying the POI.

A second aspect of part 4 of the present invention is characterized in that:

the display means displays as an object image group an object image for each POI category adjacent to a display area in which the map image is displayed;

the operation and input means includes operation means for selecting, as the predetermined operation, the object image for which a search is desired from the object image group, and dropping the object image on the map image displayed on the display means; and the first step includes a process for detecting operation on the object image with the aid of the operation means.

A third aspect of part 4 of the present invention is characterized in that:

the operation means for dropping the object image onto the map image displayed on the display means includes operation means for dragging and dropping the object image for which the search is desired; and the object image operation detection means detects operation on the object image with the aid of the operation means.

A fourth aspect of part 4 of the present invention is characterized in that:

the operation means has operation means for clicking the object image in order to set the number of POIs to be searched; and the first step includes a process for detecting operation on the object image with the aid of the operation means.

A fifth aspect of part 4 of the present invention is characterized in that:

the object image is text or a pictograph;

the operation and input means includes operation means for selecting, as the predetermined operation, the object image for which a search is desired, and dropping [the object image] on the map image displayed on the display means; and the first step includes a process for detecting operation on the object image.

A sixth aspect of part 4 of the present invention is characterized in that:

the operation means for dropping the object image onto the map image displayed on the display means includes operation means for copying and pasting the object image for which the search is desired; and the first step detects operation on the object image performed by the operation means.

A seventh aspect of part 4 of the present invention is characterized in that:

the method for displaying guidance to a POI further comprises a step in which the means for setting search starting point determines the coordinate on the map screen where the object image is dropped to be the search starting point.

A seventh aspect of part 4 of the present invention is characterized in that:

the map display system further comprises positioning means for positioning the current location; the method for displaying guidance to a POI further comprising:

a step in which the means for setting search starting point determines as the search starting point the center coordinate of the map image displayed on the display means, or the current location positioned by the positioning means.

Part 5 of the present invention is a terminal device connected to a route search server for transmitting searched POI information to the terminal device, the device having a POI database and POI search means for extracting a POI category or the POI information from object information transmitted from the terminal device, referencing the POI database, and searching for a POI; the terminal device characterized in comprising:

display means for displaying a map image;

operation and input means for performing a predetermined operation on an object image having a POI category or POI information; and object image operation detection means for detecting operation on the object image; wherein the object image operation detection means transmits information of the object image to the route search server when a predetermined operation performed on the object image is detected by the operation and input means; and the display means displays the POI on the map image on the basis of POI information received from the route search server.

Part 6 of the present invention is a terminal device connected to a route search server for transmitting to the terminal device searched POI information and route guidance to the POI from the search starting point, the device having a POI database; POI search means for extracting a POI category or the POI information from object information transmitted from a terminal device, referencing the POI database, and searching for a POI; and route search means for searching for a route to the searched POI from a search starting point transmitted from the terminal device, the terminal device characterized in comprising:

display means for displaying a map image;

operation and input means for performing a predetermined operation on an object image having a POI category or POI information;

object image operation detection means for detecting operation on the object image; and means for setting search starting point for determining the starting point of a route search; wherein the object image operation detection means detects predetermined operation performed on the object image with the aid of the operation and input means, whereupon information of the object image is transmitted to the route search server [as] information of the search starting point determined by the means for setting search starting point; and the display means moves the object image at a predetermined speed along the searched route from the search starting point to the searched POI on the map image on the basis of the route guidance and the POI information received from the route search server, and displays the POI.

EFFECT OF THE INVENTION

In part 1 of the present invention, the map display system has operation and input means for performing a predetermined operation on an object image that includes a POI category or POI information; object image operation detection means for detecting operation on the object image; and POI search means for extracting the POI category or POI information from the operated object image, referencing the POI database, and searching for a POI; and the display means displays the POI searched by the POI search means on the map image.

In accordance with such a configuration, a POI search can be carried out in a simple manner by merely performing various types of operations, e.g., using the operation and input means to drag and drop or otherwise operate a suryokun system object image that shows the POI category of the POI information for which a search is desired, and the POI thus searched can be displayed on the map image.

In part 2 of the present invention, the map display system has operation and input means for performing a predetermined operation on an object image that includes a POI category or POI information; object image operation detection means for detecting operation on the object image; means for setting search starting point for determining the starting point of a route search; POI search means for extracting the POI category or POI information from the operated object image, referencing the POI database, and searching for a POI; and route search means for searching for a route from a search starting point determined by the means for setting search starting point to the searched POI; the object image on the map image being moved at a predetermined speed along the searched route from the search starting point to the searched POI, and the POI being displayed, in the display means.

In accordance with such a configuration, since an object image is moved along a guidance route and the searched POI is displayed, the user can easily identify a guidance route to the POI. Also, when a plurality of POIs is searched, the object image arrives earliest at the nearest POI and stops, and the user can therefore easily identify the nearest POI on the map.

In the part 3 of the present invention, a method of inputting POI search conditions can be provided in the map display system of part 1 of the present invention. In part 4 of the present invention, a method for displaying guidance to a POI can be provided in the map display system of part 2 of the present invention. Also, in parts 5 and 6 of the present invention, a terminal device can be provided to the map display system according to parts 1 and 2, respectively, of the present invention.

BRIEF DESCRIPTION OF THE DRAWINGS

FIG. 8 is diagram showing an example of the display screen of POI search results and route guidance to the POI, wherein

KEY TO SYMBOLS

Figure 1:
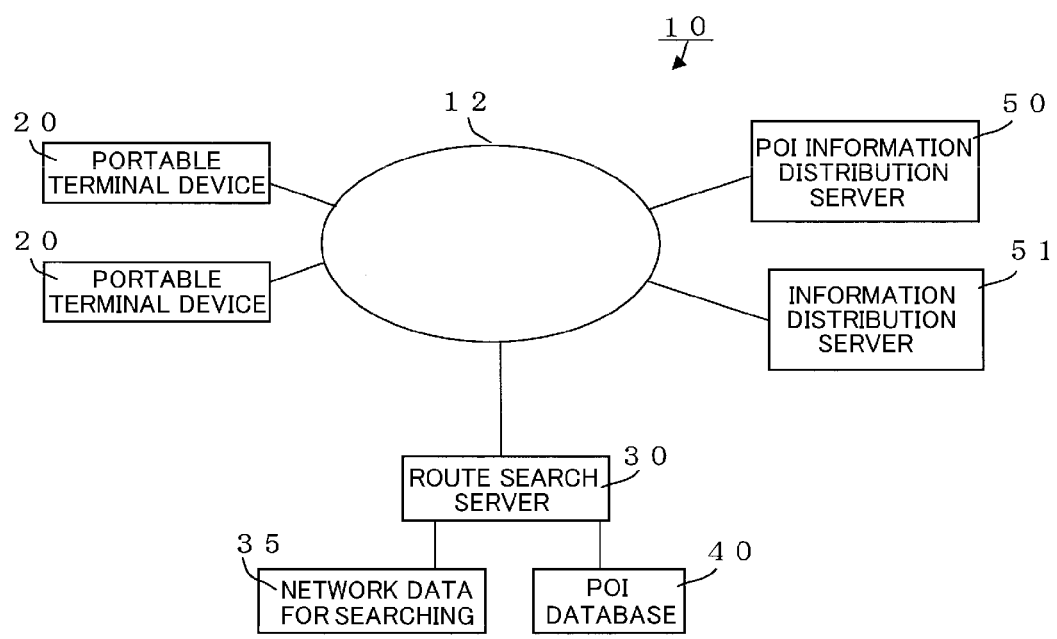
FIG. 1 is a system diagram showing the configuration of the map display system according to embodiments of the present invention.

10 navigation system (map display system)
12 network
20 portable terminal device
201 control means
21 communication means
22 positioning means
23 means for editing distribution request
24 distribution data storage means
25 operation/input means
26 display means
27 object image operation detection means
28 means for controlling display of object image
29 means for setting search starting point
30 route search server
31 control means
32 distribution data creation means
33 route search means
34 communication means
35 network data for searching
36 road network data
37 transportation network data
38 POI search means
39 object information extraction means
40 POI database

BEST MODE FOR CARRYING OUT THE INVENTION

Specific examples of the present invention will be described in detail below with reference to the embodiments and diagrams. However, the embodiments described below are used to exemplify a map display system for implementing the technical concepts of the present invention, are not intended to limit the present invention to this map display system, and may also be equally applied to map display systems of other embodiments within the scope of the claims.

EMBODIMENT 1

FIG. 1 is a system diagram showing the configuration of a navigation system, which is the map display system according to embodiments of the present invention. As shown in FIG. 1, a navigation system 10 is composed of a portable terminal device 20 connected via a network 12; a route search server 30 having a navigation function; a POI information distribution server 50 for providing POI location, service content, and other POI information that belong to various categories; an information distribution server 51 for providing music, images, and other contents; and other components. The portable terminal device 20 is a user terminal, and a mobile phone is preferably used as the portable terminal device 20.

The navigation system 10 according to the present invention is not limited to the configuration described above and may be a POI information distribution system that does not have a navigation service function; and the portable terminal device 20 is not limited to a mobile phone and may be a PDA, a music player, or another portable device, or may be a personal computer (PC).

The portable terminal device 20 sets the category of the POI for which searching is desired, the target area of the search, and other parameters, and transmits the POI search request to the route search server 30. When an ordinary navigation service is received, the portable terminal device 20 sets the departure location, the destination, and the like, and transmits the route search request the route search request to the route search server 30. The route search server 30 gathers POI information from the POI information distribution server 50 and stores the information in a POI database 40.

The route search server 30 is provided with network data 35 for searching in order to search for a route, and the POI database 40 for storing POI location position, service content, and POI information belonging to the various POI categories. When a POI search request is received from the portable terminal device 20, the POI database 40 is searched to extract the corresponding POI, the network data 35 for searching is referenced to search for the route to the POI, and the POI information and route guidance information are distributed to the portable terminal device 20. When a route search request is received, a recommended route that matches the route search conditions (departure location, destination, and other setting conditions) is searched with reference to the network data 35 for searching, and the guidance route information is transmitted to the portable terminal device 20.

Figure 2:
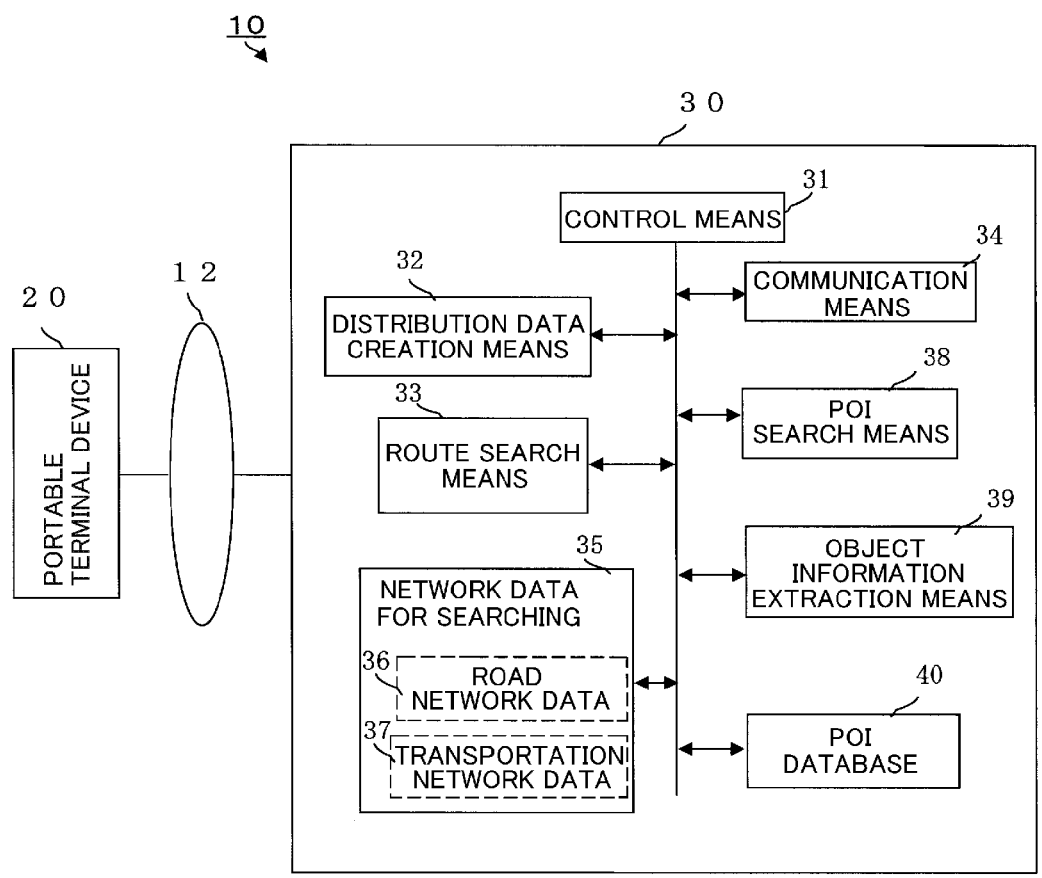
FIG. 2 is a block diagram showing the configuration of the route search server according to the present invention.

FIG. 2 is a block diagram showing the configuration of the route search server 30 shown in FIG. 1. The route search server 30 is provided with control means 31, distribution data creation means 32, communication means 34, route search means 33, a network data 35 for searching, and the like. The network data 35 for searching stores road network data 36 for searching a route for a car and pedestrian, and transportation network data 37 for searching a route using transportation systems.

The control means 31 is a microprocessor having a RAM, a ROM, and a processor (not shown), and controls the operation of each part by using a control program stored in the ROM. The communication means 34 is an interface for communicating with the portable terminal device 20 via networks 11, 12 and with the POI information distribution server 50 that provides a variety of POI information. The distribution data creation means 32 is used for editing the results of route and POI searches to obtain data for distribution to the portable terminal device 20. The route search server 30 collects POI information from various POI information distribution servers 50 via the network 12, registers the information in the POI database 40, and enhances the POI information that can be provided to the user.

The route search means 33 is a multimodal route search engine, and has a route search function that uses both pedestrian and transportation systems. Such a route search engine is disclosed in, e.g., Japanese Laid-open Patent Application 2000-258184, and other publications. A well-known technique referred to as the Dijkstra method is used as the route search method, and the route search conditions and the POI search conditions are transmitted from the portable terminal device 20.

The POI information accumulated in the POI database 40 is searched and referenced by POI search means 38; and the POI information requested using the POI category, area, or the like specified by the portable terminal device 20 as a search condition is searched and distributed to the portable terminal device 20. Object information extraction means 39 extracts POI information required for a POI search from the object information for a POI search transmitted from the portable terminal device 20 according to the present invention in the manner described below.

Figure 3:
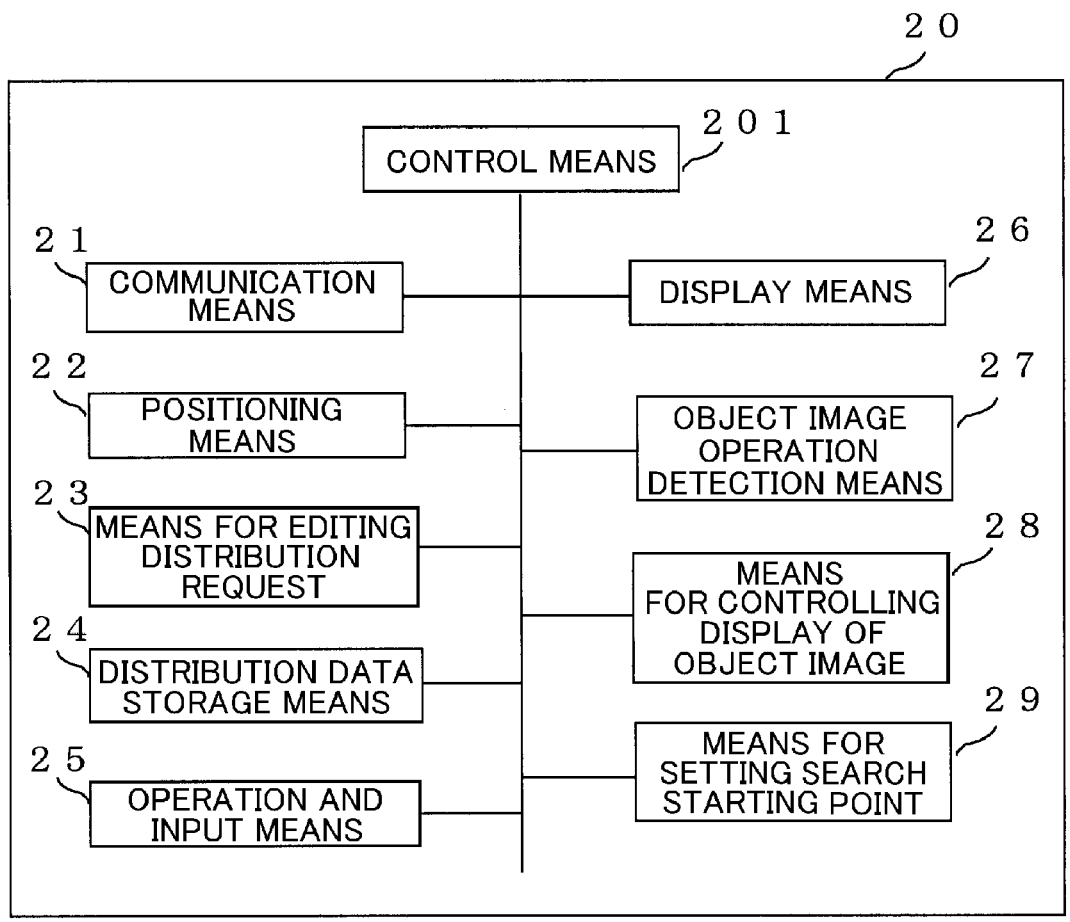
FIG. 3 is a block diagram showing the configuration of the portable terminal device according to the present invention.

The portable terminal device 20 is composed of control means 201, communication means 21, positioning means 22, means 23 for editing distribution request, distribution data storage means 24, operation and input means 25, display means 26, means 27 for detecting operation on object image, means 28 for controlling display of object image, and means 29 for setting search starting point, as shown in FIG. 3. Positioning means 22 is composed of a GPS processing circuit or the like, receives and processes a GPS satellite signal, and represents the current position of the portable terminal device 20 as a longitudinal and latitudinal position.

The control means 201 is a microprocessor having a RAM, a ROM, and a processor (not shown), and controls each part with the aid of a control program stored in the ROM. The communication means 21 is an interface for communicating with the route search server 30 via the network 12.

The operation and input means 25 is used for operation and input using numerical keys, alphabet keys, and other functional keys, as well as selection keys, scroll keys, and the like; selecting a desired menu from a menu screen displayed on the display means 26 as output means; or alternatively performing various input operations by using keys. Therefore, the display means 26 functions as a part the operation and input means 25. Also, the operation and input means 25 may be provided with a mouse or other operation means. In the present invention, the operation and input means 25 can click, drag and drop, copy and paste, and perform various other operations on the object image described below. The means 27 for detecting operation on object image detects the operation made to the object image by the operation and input means 25.

The means 23 for editing distribution request edits POI search conditions and route search conditions that have been inputted via the operation and input means 25, a menu screen displayed on the display means 26, or another input means, as a distribution request to be transmitted to the route search server 30. The result of the POI search or the route search performed by the route search server 30 in accordance with the distribution request is distributed to the portable terminal device 20 as POI information and route guidance information. The portable terminal device 20 temporarily stores distribution data distributed from the route search server 30 in the distribution data storage means 24. The POI information, route guidance information, or other distribution data stored in the distribution data storage means 24 is read as required and displayed on the display means 26.

The means 27 for detecting operation on object image, means 28 for controlling display of object image, and means 29 for setting a search starting point are parts that operate when the POI search conditions according to the present invention are set in the manner described below. In the present invention, an arrangement is adopted in which the portable terminal device 20 receives a distribution of map data from the route search server 30 by some procedure, and displays the map on the display means 26. For example, an arrangement may be adopted in which the current position established by the positioning means 22 is transmitted to the route search server 30, map data in a predetermined range centered about the current position is requested and received, and the map is displayed on the display means 26.

Figure 4:
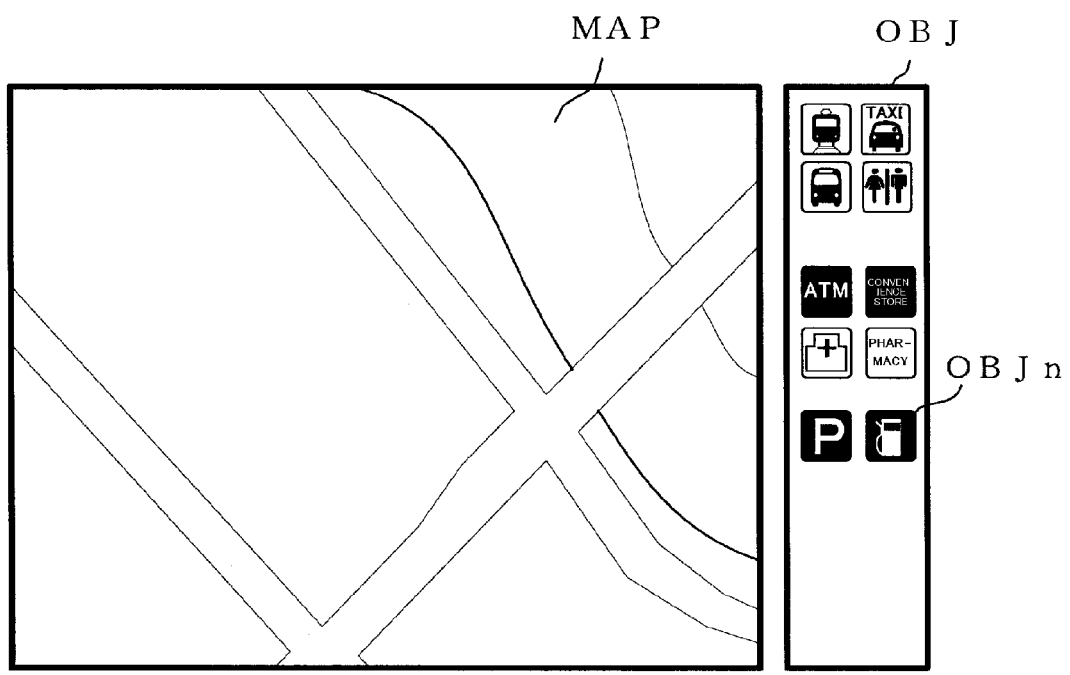
FIG. 4 is a diagram showing the configuration of the display screen in the portable terminal device according to the present invention.
Figure 5:
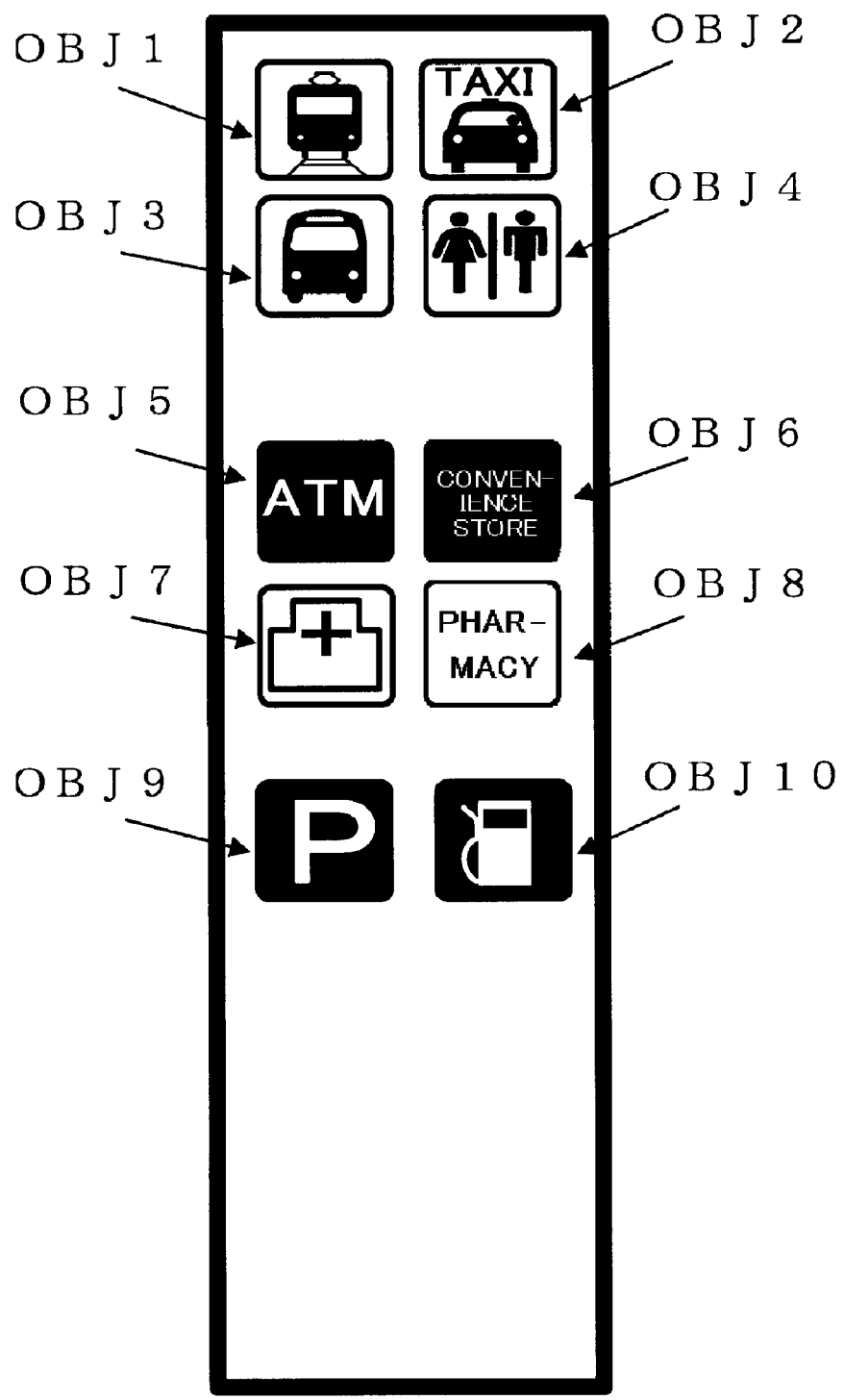
FIG. 5 is a diagram showing an example of the object image used for category selection or the like of a POI in the present invention.

FIG. 4 is a diagram showing the configuration of the display screen in the portable terminal device according to an embodiment of the present invention. The display screen, in a state in which a map is displayed on the display means 26 in the manner described above, displays a map image MAP such as that of FIG. 4, and displays an object image group OBJ nearby. The data of the object image displayed in the object image group OBJ is stored in the means 27 for detecting operation on object image.

Object images OBJ1 to OBJ10 displayed in the object image group OBJ show specific POI categories, and are assigned the codes of the POI categories. For example, object OBJ1 shows a train station, OBJ2 a taxi boarding area, OBJ3 a bus stop, OBJ4 a restroom, OBJ5 an automatic teller machine, OBJ6 a convenience store, OBJ7 a hospital, OBJ8 a pharmacy, OBJ9 a parking lot, and OBJ10 a gas station.

Object images OBJ1 to OBJ10 displayed in the object image group OBJ can be selected by moving a selection cursor onto a desired object image and dragging and dropping the object image on the map image. When the object image is dropped onto the map image, the position is detected as a position coordinate of the display screen by the means 29 for setting search starting point.

Figure 6:
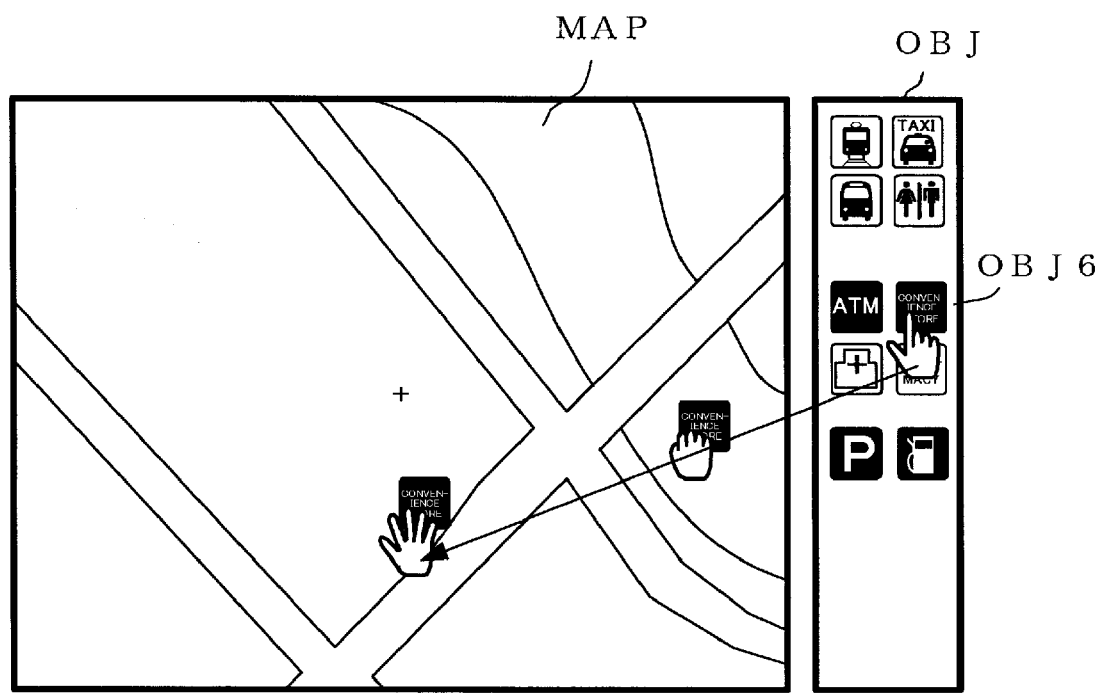
FIG. 6 is a schematic diagram showing a display screen for describing the state in which a desired object image is dragged and dropped on the map image.

FIG. 6 is a view that schematically shows a display screen for describing the state in which a desired object image is dragged and dropped on the map image. When a user desires to search for a convenience store, the user selects an object image OBJ6 that shows a convenience store from the object images displayed in the object image group OBJ in the manner shown in FIG. 6, and performs a drag and drop operation to drop the object image OBJ6 on the desired position on the map image.

The position where the object image OBJ6 is dropped is detected by the means 29 for setting a search starting point as the position coordinate of the display screen as described above. In this case, the position of the object image can be detected as the absolute position information from the longitude and latitude information of the displayed map image by converting the position coordinate of the display screen to longitude and latitude.

In other words, in the present invention, there is no need to make a selection by inputting the POI category for which a search is desired, or to move through a hierarchy of a list of categories displayed on the menu screen, and a POI category can be specified and a POI search request made by way of a simple operation in which a desired object image is dragged and dropped on a map. The object image is provided with categories of POIs in the form of images such as an icon image that can be intuitively understood, and there is no confusion as to which object image should be selected.

The means 23 for editing distribution request edits as a POI search request the selected object image, the dropped position on the map image, and other object information, and transmits the information to the route search server 30. The route search server 30 receives the object image and searches for a POI that exists in the area of the map range displayed on the portable terminal device 20. A route is searched to each of the applicable POIs obtained by the POI search.

The starting point of the route search to the POI is determined by the means 29 for setting search starting point, but the search starting point may be a position on the map image on which the object image OBJ6 has been dropped, or may be the current position of the portable terminal device 20. Since the map image displayed on the display means 26 is displayed with the current position of the portable terminal device 20 at the center, the route to the POI may be searched using the current position or the center position of the map image as the departure point, even if the object image OBJ6 is dropped in any position of the map image.

In many cases, the user uses the portable terminal device 20 and makes a POI search in the current position in which the portable terminal device 20 is positioned, so it is natural to perform a route search using the latter current position as the departure point. The former can be applied to cases in which the destination is known and the map image of the destination area is displayed. A configuration may also be adopted in which POI search conditions are determined by only a click operation on the object image without dragging and dropping the object image on the map image when the current position is used as the starting point of the route search to a POI.

Generally, when a POI in the area from a certain location is searched, there are cases in which the nearest POI is searched from the location, and cases in which a number of candidate POIs a short distance away are searched. In the present invention, it is possible to specify whether a number of candidate POIs is searched by right-clicking a selected object image OBJ6 prior to dragging and dropping the object image OBJ6.

Figure 7:
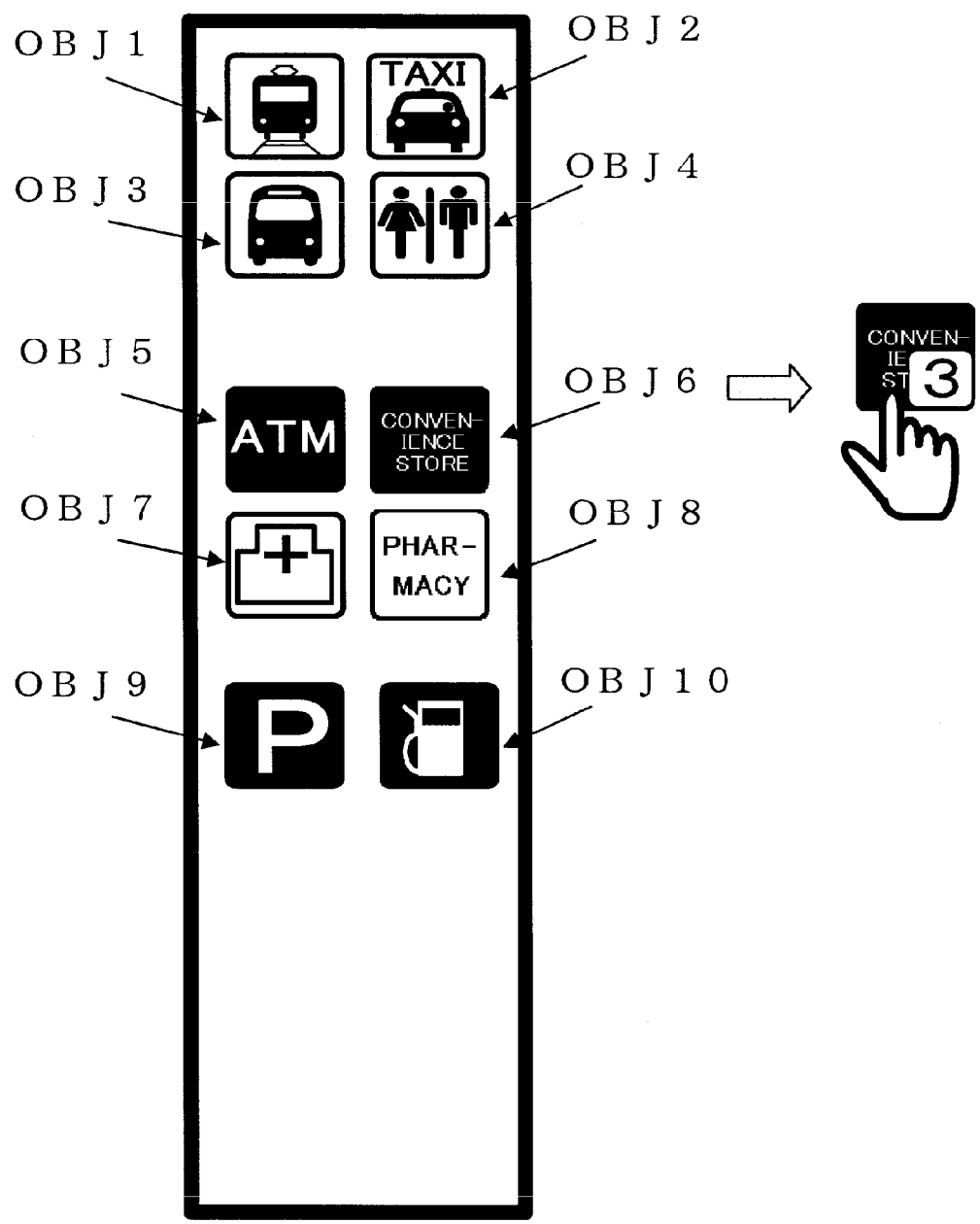
FIG. 7 is a diagram describing the relationship between the number of clicks of the object image and the number of POI searches.

FIG. 7 is a diagram describing the change the number of POI searches produced by the number of right clicks of the object image. FIG. 7 shows a state in which the object image OBJ6 has been right-clicked twice. The image changes to one in which a number obtained by adding "1" to the number of clicks is included in the object image. This number shows that it has been specified that three nearby convenience stores from search starting point (current location or the like) be searched in the order of the nearest in terms of distance. When a right click has not been made, it is specified that the nearest single POI be searched, and when a single right click has been made, it is specified that two POI be searched in the order of the nearest in terms of distance.

Described next is a process in which a POI search request is made from the portable terminal device 20 to the route search server 30 in this manner, and a display is provided on the portable terminal device 20 after the result of the POI search, as well as the route data from the point of the route search to the POI thus searched, have been received from the route search server 30.

FIG. 8 is diagram showing an example of the display screen of POI search results and route guidance to the POI in accordance with the present invention. FIG. 8 shows the display screen for the case in which the object image OBJ6 has been right-clicked twice and dragged and dropped on the location P on the map image, and in which the route search server 30 searches three POIs (convenience stores) 81 to 83 in sequence of proximity in terms of distance using the location P as the starting point, searches for a route from P to each of the POI 81 to 83, and distributes [the result] to the portable terminal device 20.

Figure 8A:
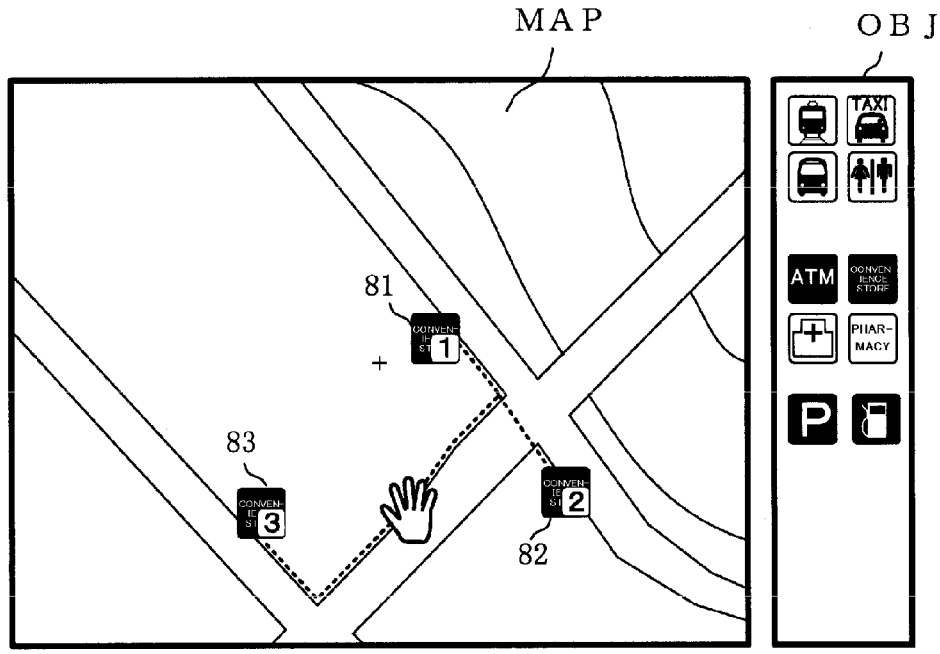
FIG. 8A is a diagram showing an intermediate state of the route guidance display to three POI thus searched.
Figure 8B:
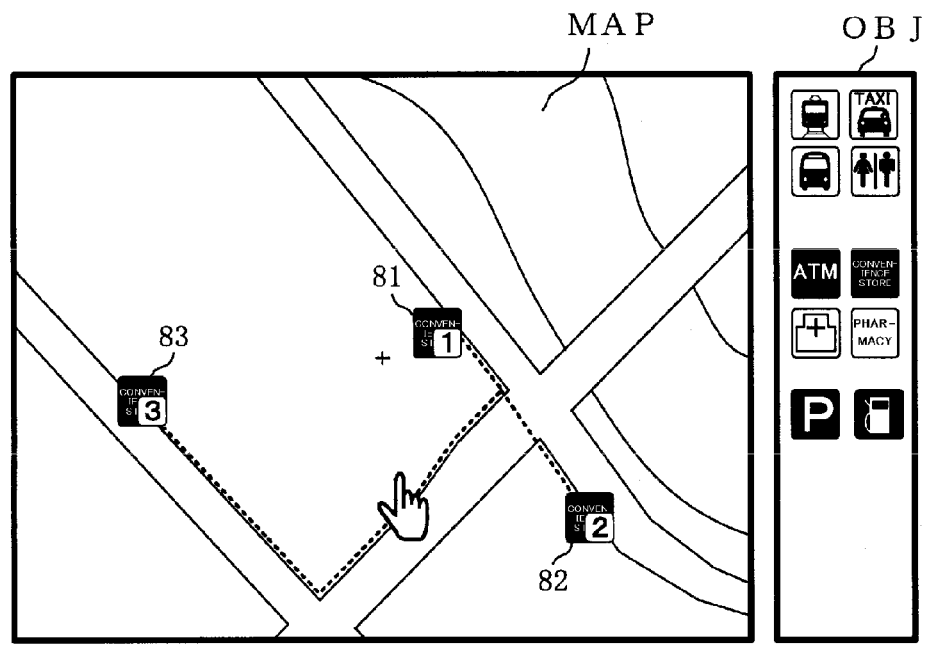
FIG. 8B is a diagram showing the final state of the route guidance display to three POI thus searched.

In FIG. 8, FIG. 8A is a diagram showing an intermediate state of the route guidance display to the POIs by the object images 81 to 83, which show the three POIs thus searched; and FIG. 8B is a diagram showing the final state of the route guidance display to three POI thus searched by the object images 81 to 83, which show the three POIs thus searched. In the present invention, the object images 81 to 83 showing the POI categories as search objects are displayed by a dotted line or the like on the movement route while being moved at a predetermined movement speed along the route guidance, and route guidance is provided to the POI. When [the user] has arrived as the position of the POI, display of the object image is stopped, and the fact that the position is the position of the POI is displayed.

When a plurality of POIs is searched in the manner shown in FIG. 8, a number from "1" to "3" is added to the image display in sequence to the nearest, in terms of distance, object images 81 to 83 indicating each POI, and the object images 81 to 83 move at equal speeds to the POI. Therefore, at a midway point of the route guidance display, the earliest object image 81 moves and stops at the nearest POI position from the starting point of the search, as shown in FIG. 8A.

When the all object images 81 to 83 stop on the display screen, the route guidance display enters a final state, as shown in FIG. 8B, the position at which the object images 81 to 83 have stopped display the position of each applicable POI, and the route from the starting point of searching to each POI is displayed by a dotted line.

To search for a POI in the route search server 30, it may be expedient to make a selection based on sequence of straight line distances from the starting point of the search, or to make a selection from short route distances along an actual pedestrian route. The example of FIG. 8 shows a case in which a POI is searched in the sequence of distances along the actual movement route. The starting point of a search as described above may be the location at which an object image has been dropped or may be the current position of the portable terminal device 20.

In this manner, a POI search can be carried out in a simple manner by merely performing various types of operations, e.g., using the operation and input means to drag and drop or otherwise operate a suryokun system object image that shows the POI category or the POI information for which a search is desired.

The searched plurality of POIs is displayed while object images 81 to 83 or the like are moved along a guidance route, whereby the user can easily identify a guidance route to the POI. Also, the object image arrives earliest at the nearest POI and stops, and the user can therefore easily identify the nearest POI on the map.

In the case that the portable terminal device 20 is a navigation device, an instruction to start guidance can be given when an object image dropped on the map is clicked. The configuration may be one in which a "hand palm image" in which the palm of a hand is open is displayed, and no operation can be performed, immediately after an object image is dropped on the map. When the movement of the object image stops, the "hand palm image" changes to an index finger, and a click operation can be received.

In the case that searched plurality of POIs does not fit on the displayed map screen, the POI can be suitably displayed by zooming and scrolling. Also, in the example described above, the configuration is one in which an object image group OBJ is displayed adjacent to the map display area, but another configuration may be adopted.

In other words, the object image displayed on the map may be dragged and dropped, and incorporated into the POI search menu. Although this is unsuitable for a raster map, an object image can be formed so as to be able to be dragged in a vector map. In this case, the configuration may be one in which the object image does not disappear from the map, but rather the object image, i.e., a set of the category attributes of the POI, is copied onto the POI search menu together with object image.

Road network data 36 that is used for searching for a route in a pedestrian navigation system or a car navigation system is configured in the following manner. For example, when the road is composed of roads A, B, C as shown in FIG. 9, then intersections, directional change points, the end points of the roads A, B, C, and the like are used as nodes; roads that connect between the nodes are represented as directional links; and also provided are node data (longitude and latitude of the nodes) and link cost data that includes link data (link number) and the link cost of each link (distance of the link or time required to travel through the link).

Figure 9:
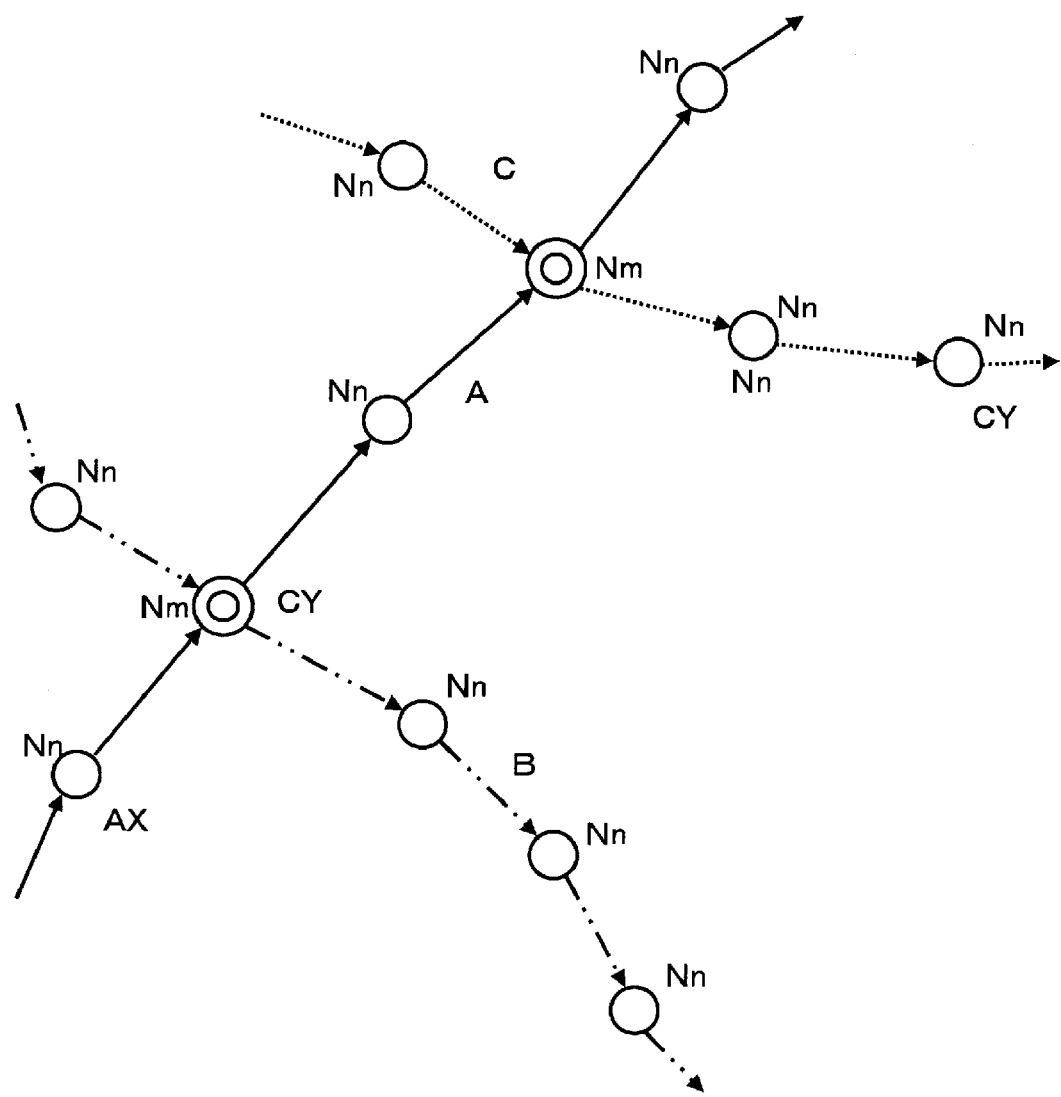
FIG. 9 is a schematic view for describing the data of a road network for a route search.

In other words, in FIG. 9, Nn (marked by ○) and Nm (marked by ⊙) indicate nodes, and Nm (marked by ⊙) indicate intersections of roads. Directional links for connecting the nodes are indicated by arrow lines (solid, dotted, dotted-chain lines). Links include links that have directional orientation to indicate upward- and downward-sloped roads, but in FIG. 9, only links having orientation arrows are shown in order to simplify the drawing.

In the case that a route search is performed using data of such a road network as a database for a route searched, the links connected from the node of the departure point to the node of the destination are followed, the link costs are totaled, and the route that minimizes total link cost is searched to provide guidance. In other words, when a route search is carried out using node AX as the departure point and node CY as the destination in FIG. 9, the link cost is totaled by sequentially following the link that travels from the node AX, makes a right turn at the second intersection, enters road C, and arrives at node CY. The route the produces the lowest total link costs is searched and guidance is provided.

In FIG. 9, other routes from the node AX to the node CY are not shown, but since there are actually other such routes, a plurality of routes that can reach node CY from node AX are searched in the same manner, and the route having the lowest link cost among the searched routes is determined to be the optimal route. This technique is performed by using a known method referred as the Dijkstra method.

Figure 10:
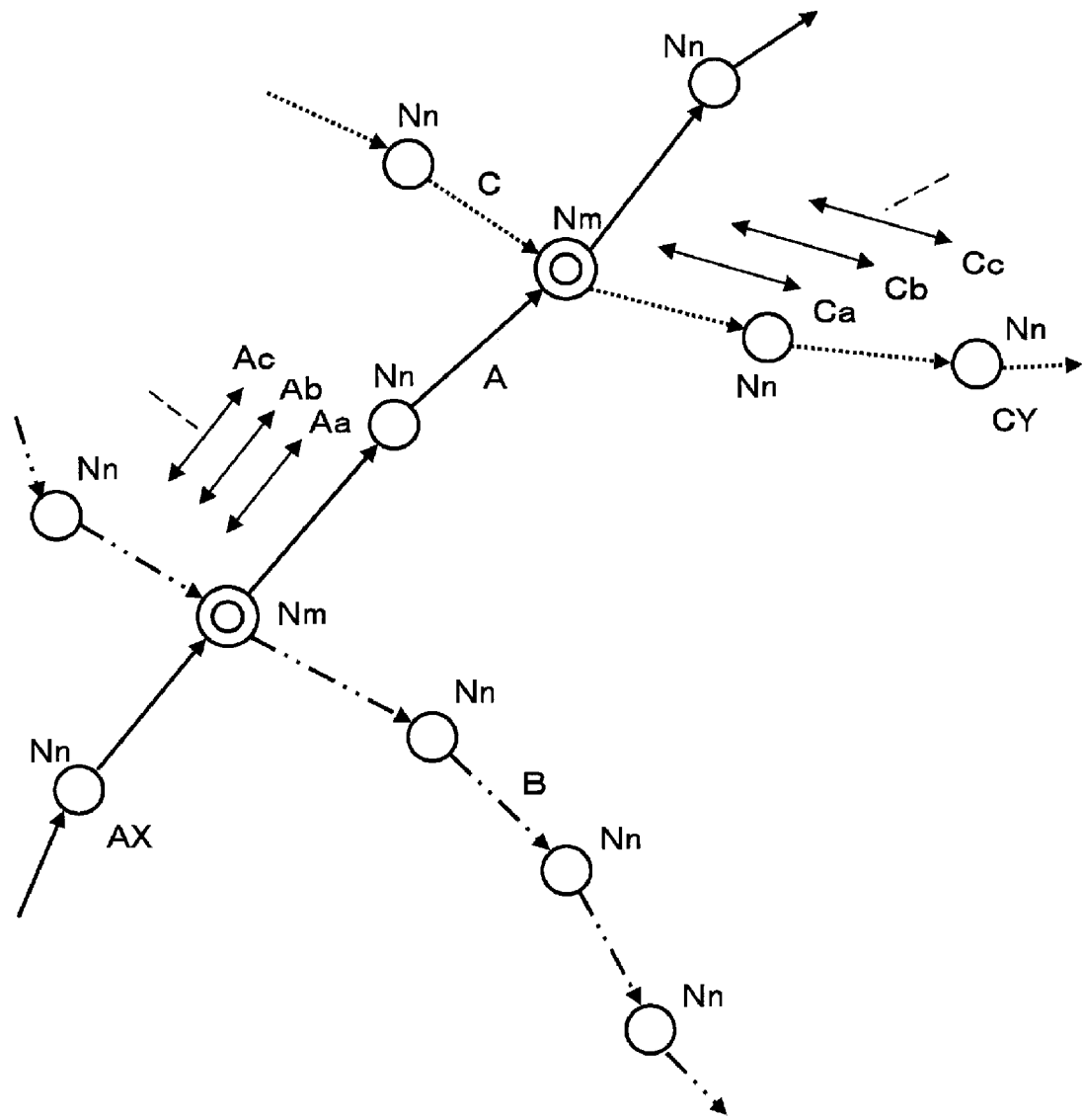
FIG. 10 is a schematic view for describing transportation network data for a route search.

In contrast, transportation network data 37 for searching the routes of transportation systems is configured in the following manner. For example, when the data is composed of transportation lines A, B, C as shown in FIG. 10, the stations (airports in the route of an aircraft) located on the transportation lines A, B, C are used as nodes, the intervals connecting each node represent directional links, and node data (longitude and latitude of the nodes) and link data (link number) are designated as network data. In FIG. 10, Nn (marked by ○) and Nm (marked by ⊙) indicate nodes, and Nm (marked by ⊙) indicates transfer points (transfer stations) of transportation systems. Directional links that connect between each node are indicated by arrow lines (solid, dotted, dotted-chain lines). Links include links that have directional orientation to indicate upward- and downward-sloped transportation lines, but in FIG. 10, only links having orientation arrows are shown in order to simplify the drawing.

However, a transportation network is essentially different that a road network in terms of link costs. In other words, the link costs in a road network are fixed and static, but in a transportation network, there is a plurality of trains and aircraft (hereinafter the routes of trains, aircraft, and the like are referred to as transportation means) that operate along transportation lines in the manner shown in FIG. 10. The departure times for nodes at each transportation means and the arrival times at the next node are established (stipulated by timetable data, and operation data), and there are cases in which individual routes do not necessarily link to adjacent nodes. Such cases include express trains and local trains, for example. In such cases, a plurality of different links is present on the same transportation line, and there are cases in which the required time between nodes is different depending on the transportation means.

In the transportation network shown as an example in FIG. 10, a plurality of transportation means (routes) Aa to Ac, etc. are present on the same links of transportation route A, and a plurality of transportation means (routes) Ca to Cc, etc. are present on the transportation route C. Therefore, the operation network of the transportation system is different than the simple road network, and the data of the nodes, links, and link costs is a data amount that is proportional to the total number of transportation means (the routes of individual aircraft, trains, and the like). Accordingly, the data of the transportation network is a considerable amount of data in comparison with the data amount of a road network. Therefore, the time required for a route search also requires a considerable amount of time in accordance therewith.

In order to search for a route from a certain departure point to a destination using such transportation network data, all transportation means that can be used (boarded) when beginning from the departure point to the destination must be searched to identify a transportation means that matches the search conditions.

For example, in FIG. 10, a specific departure time is specified using the departure point as the node AX of the transportation line A, and when the node CY of the transportation line C is searched for a route to a destination, all transportation means from the departure time and thereafter are sequentially selected as a route of the departure time from among the transportation means Aa to Ac, etc. that operate on the transportation line A. All combinations of transportation means at times that are possible for boarding and thereafter are searched in the transfer node from among the transportation means Ca to Cc, etc. that operate on the transportation line C on the basis of the arrival time at the node for transferring to the transportation line C; and the time required for each route, the number of transfers, and other data are totaled and guidance is provided.

Figure 11:
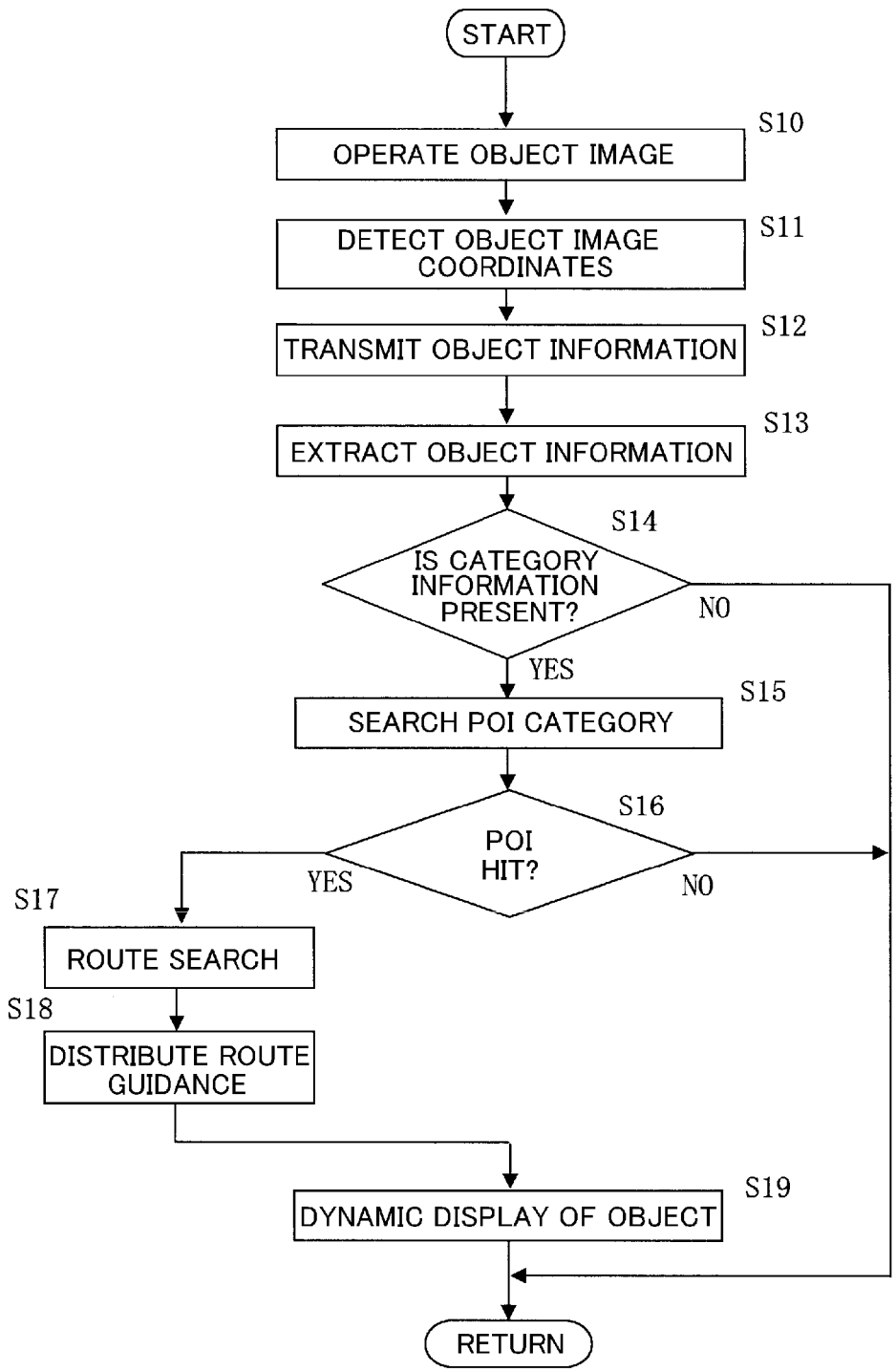
FIG. 11 is a flowchart showing the operation sequence of the navigation system according to the present invention.

The operating procedure of the navigation system according to the present invention will be described next with reference to the flowchart shown in FIG. 11. The flowchart of FIG. 11 shows the process from step S10 to step S12, the process of step S19 shows the process of the portable terminal device 20. The process of step S14 to step S18 shows the process in the route search server 30.

First, when an object image is operated and dropped on a map image in the process of step S10, the means 29 for setting search starting point detects the position in the process of step S11. The position of the object image may be detected using the coordinates on the display screen as described above, or may be detected as the absolute position by converting the detected coordinates to longitude and latitude, on the basis of longitude and latitude of the displayed map image.

Next, in the process of step S12, the portable terminal device 20 transmits to the route search server 30 the object information produced by operating the object image, i.e., the POI category and the position information of the object image that corresponds to the object image, the number of POIs to be searched, and other information.

When the route search server 30 receives object information from the portable terminal device 20, the object information extraction means 39 extracts the POI category and the position information of an object image from the object information, the number of POIs to be searched, and other POI information in the process of step S13. Next, in the process of step S14, a determination is made as to whether the information of the POI category could be extracted. The process proceeds to the return step when the information of the POI category could not be extracted.

When the information of the POI category has been extracted in the process of step S14, the process proceeds to step S15, and the POI search means 38 references the POI database 40 and searches for a POI that belongs to the specified POI category. In the process of step S16, it is determined whether an applicable POI has been hit. The process proceeds to the return step when an applicable POI has not been hit.

When an applicable POI has been hit in the determination process of step S16, the process proceeds to step S17, and the route search means 33 searches for a route to each POI on the basis of the position of the object image as the starting point of the search. In a case such as FIG. 8, in which guidance for three POIs is provided in the order of proximity, three POIs are determined in the order of the shortest routes, and route guidance data and position information of the POIs are distributed to the portable terminal device 20 in the process of step S18.

EMBODIMENT 2

In embodiment 1 described above, an example was shown in which a desired POI is searched by operating an object image that shows a POI category, but the object dropped on the map image is not limited to the object images (icon images) such as those of embodiment 1. It is desirable that all images can be construed to be associated with the position information of a POI for which a search is desired.

For example, when a POI is searched based on an email received on a mobile phone or another portable terminal device 20, an operation is performed in with all or a part of the main body of the email is copied and pasted onto the map image. Therefore, in the example of embodiment 2, all or a part of the main body of an email can be made to correspond to the object image referred to in embodiment 1. The configuration of the navigation system in the present embodiment 2 is the same as the configuration of embodiment 1, and a function is provided in which the main body of an email or the like can be copied and pasted as an object image, and the object image dropped on a map image.

Therefore, in embodiment 2, the portable terminal device 20 transmits as object information to the route search server the text data of an email as the object image dropped on the map image and the position information of the text data thus dropped. The route search server 30 extracts the POI information related to the POI category and position from the text data of the email, which is the object information received from the portable terminal device 20.

The POI information contained in an object image (e.g., main body of an email) can be treated as any of the following types of information.

A: Spot name, address, a fixed telephone number, zip code (information indicating a specific facility)

B: Pictograph, word

In the present specification, such POI information is referred to as "characteristic information." Therefore, applicable POI can be searched from the characteristic information.

After an applicable POI has been searched, the route from the starting point of the search to the POI is searched and transmitted to the portable terminal device 20, and the object image in the portable terminal device 20 is moved and displayed along the guidance route. This operation is the same as in embodiment 1. In the case that the object dropped on the map image is the main body of an email, the object image may be moved and displayed along the guidance route from the starting point of the search to the POI using the icon image shown in the email.

Figure 12:
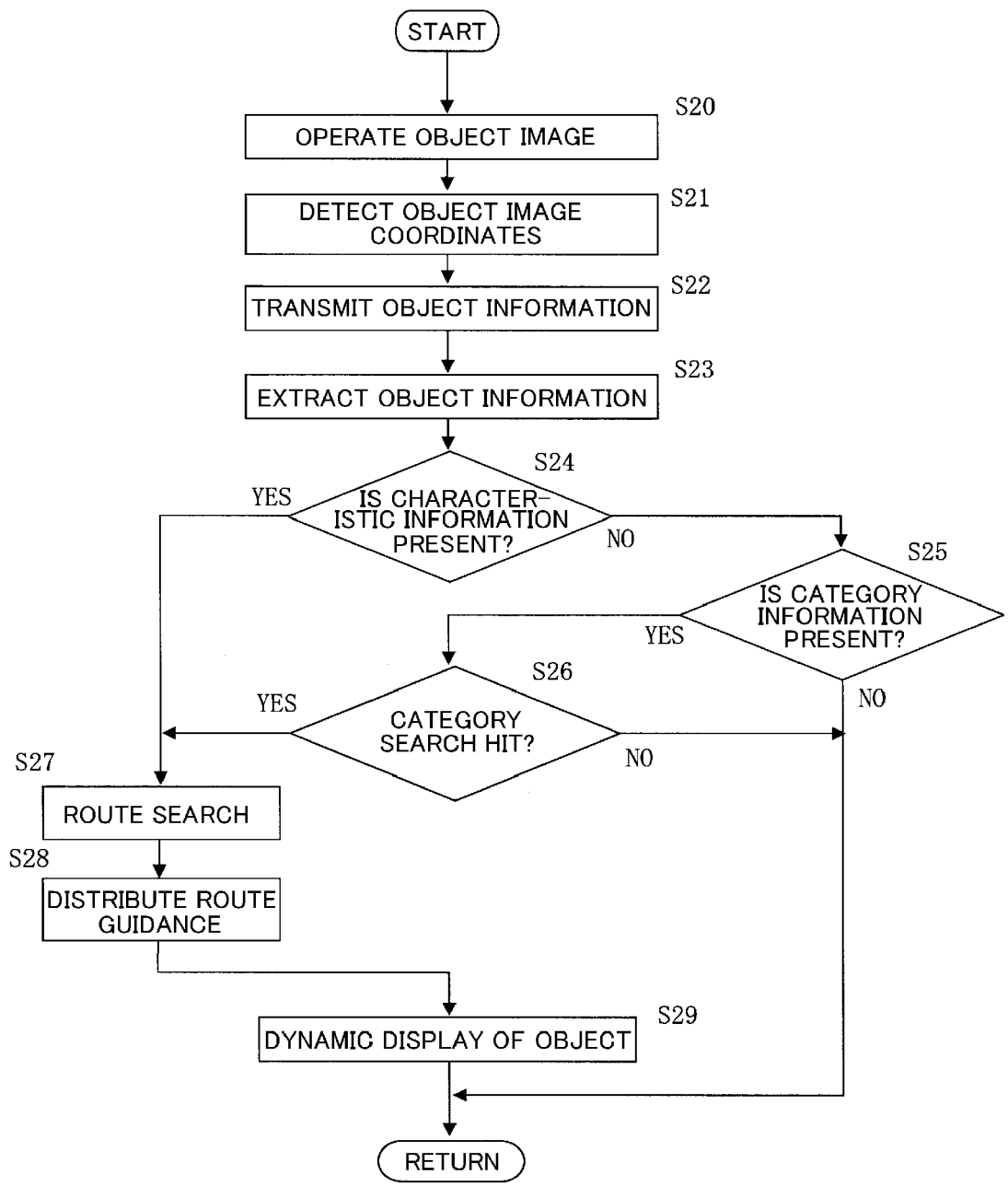
FIG. 12 is a flowchart showing the operation sequence of the navigation system according to a second embodiment of the present invention.

FIG. 12 is a flowchart showing the operation sequence of the navigation system according to a second embodiment of the present invention. In the flowchart of FIG. 12, the process from step S20 to step S22 and the process of step S29 show the process of the portable terminal device 20. The process from step S24 to step S28 shows the process of the route search server 30.

First, when the object image is operated and dropped on the map image in the process of step S20, the means 29 for setting search starting point detects the position of the drop in the process of step S21. At this point, the object dropped on the map image is a portion that contains POI information that the user has searched from the main body of an email.

Next, the portable terminal device 20 transmits the object information produced by operating the object image to the route search server 30 in the process of step S22. In other words, the POI information and the position information of the object image corresponding to the object image are transmitted to the route search server 30.

When the route search server 30 receives the object image from the portable terminal device 20, the object information extraction means 39 extracts the POI information related to the POI from the object information in step S23. Next, a determination is made as to whether characteristic information is contained in the POI information in the process of step S24. The process proceeds to the return step when the POI information cannot be extracted.

In the case that there is no characteristic information in the POI information in the process of step S24, a determination is made as to whether there is information corresponding to the POI category in the process of step S25. Examples of such information include pictographs used in an email to a mobile phone and information associated with a category. There are many pictographs that can be associated with POI categories, e.g., a drawing of a coffee cup for a "café," a knife and fork for a "restaurant," as well as drawings for a "noodle shop," "restroom," and "bank."

Such pictographs have a code established for each mobile phone company in terms of data. Therefore, the POI category can be extracted as long as the server provides data related to the POI category. In such a scheme, the process proceeds to the process of step S26 as long as the POI category is extracted. The POI search means 38 references the POI database 40 and searches for a POI that belongs to a specified POI category in the process of step S26, and determines whether an applicable POI has been hit. The process proceeds to the return step when an applicable POI has not been hit.

The process proceeds to step S27 if the POI information can be extracted from the characteristic information in the process of step S24, the POI search means 38 references the POI database 40 and searches for an applicable POI, and the route search means searches for a route from the starting point of the search to the applicable POI.

On the other hand, the process proceeds to step S27 when an applicable POI is hit in the decision process of step S26; the route search means 33 searches for a route to the POI on the basis of the position of the object image, which is the search starting point; and the route guidance data and the position information of the POI are distributed to the portable terminal device 20 in the process of step S28.

INDUSTRIAL APPLICABILITY

The present invention can provide a simple user interface (UI) whereby a POI can be searched for by using a mouse operation with which anyone is familiar in a PC (personal computer), and by dropping on a map image an object image containing POI information and a POI category for which a search is desired. A UI can be implemented not only in a PC, but also in an email function of a mobile phone as well, in which text or a pictograph included in the text is dropped as an object on the map image.

The object image is one in which a meaningful image such as an icon image that does not depend on language can be used and a universally common operation implemented. [The present invention] is most suitable for application in map display devices and the like disposed in international terminals and other locations.

The invention claimed is:

1. A map display system composed of a terminal device having display means for displaying a map image, and a route search server having a point of interest (POI) database, said map display system comprising:
   operation and input means for performing a predetermined operation on an object image that includes a POI category or POI information;
   object image operation detection means for detecting operation on said object image; and
   POI search means for extracting the POI category or POI information from said operated object image, referencing said POI database, and searching for a POI; and
   said display means displays a POI searched by said POI search means on the map image,
   wherein said display means displays as an object image group an object image for each POI category adjacent to a display area in which the map image is displayed,
   said operation and input means includes operation means for selecting, as said predetermined operation, said object image for which a search is desired from said object image group, and dropping said object image on the map image displayed on said display means, and
   said object image operation detection means detects operation on said object image with the aid of said operation means.

2. The map display system according to claim 1, wherein:
   the operation means for dropping said object image onto the map image displayed on said display means includes operation means for dragging and dropping the object image for which said search is desired; and
   said object image operation detection means detects operation on said object image with the aid of said operation means.

3. The map display system according to claim 1, wherein:
   said operation means has operation means for clicking said object image in order to set the number of POIs to be searched; and
   said object image operation detection means detects the number of clicks of the object image performed by said operation means.

4. The map display system according to claim 3, wherein:
   said object image is text or a pictograph; and
   said operation and input means includes operation means for selecting, as said predetermined operation, said object image for which a search is desired, and dropping said object image on the map image displayed on said display means.

5. The map display system according to claim 4, wherein:
   the operation means for dropping said object image onto the map image displayed on said display means includes operation means for copying and pasting the object image for which said search is desired; and
   said object image operation detection means detects operation on said object image performed by said operation means.

6. A map display system composed of a terminal device having display means for displaying a map image, and a route search server having a point of interest (POI) database, said map display system comprising:
  operation and input means for performing a predetermined operation on an object image that includes a POI category or POI information;
  object image operation detection means for detecting operation on said object image;
  means for setting search starting point for determining the starting point of a route search;
  POI search means for extracting the POI category or POI information from said operated object image, referencing said POI database, and searching for a POI; and
  route search means for searching for a route from a search starting point determined by the means for setting search starting point to said searched POI, and
  said object image on the map image being moved at a predetermined speed along said searched route from said search starting point to said searched POI, and the POI being displayed, in said display means,
  wherein said display means displays as an object image group an object image for each POI category adjacent to a display area in which the map image is displayed;
  said operation and input means includes operation means for selecting, as said predetermined operation, said object image for which a search is desired from said object image group, and dropping said object image on the map image displayed on said display means; and
  said object image operation detection means detects operation on said object image with the aid of said operation means.

7. The map display system according to claim 6, wherein:
  the operation means for dropping said object image onto the map image displayed on said display means includes operation means for dragging and dropping the object image for which said search is desired; and
  said object image operation detection means detects operation on said object image with the aid of said operation means.

8. The map display system according to claim 6, wherein:
  said operation means has operation means for clicking said object image in order to set the number of POIs to be searched; and
  said object image operation detection means detects the number of clicks of the object image performed by said operation means.

9. The map display system according to claim 8, wherein:
  said object image is text or a pictograph; and
  said operation and input means includes operation means for selecting, as said predetermined operation, said object image for which a search is desired, and dropping said object image on the map image displayed on said display means.

10. The map display system according to claim 9, wherein:
  the operation means for dropping said object image onto the map image displayed on said display means includes operation means for copying and pasting the object image for which said search is desired; and
  said object image operation detection means detects operation on said object image performed by said operation means.

11. The map display system according to claim 6, wherein:
  said means for setting search starting point determines as the search starting point the coordinate on the map screen where said object image is dropped.

12. The map display system according to claim 6, wherein:
  said map display system further comprises positioning means for positioning the current location; and
  said means for setting search starting point determines as the search starting point the center coordinate of the map image displayed on said display means, or the current location positioned by said positioning means.

13. A method for inputting a point of interest (POI) search condition in a map display system composed of a terminal device having display means for displaying a map image, and a route search server having a POI database; the method characterized in that: said map display system has operation and input means for performing a predetermined operation on an object image that includes a POI category or POI information; object image operation detection means for detecting operation on said object image; and POI search means for extracting the POI category or POI information from said operated object image, referencing said POI database, and searching for a POI; the method comprising:
  a first step for detecting that said object image operation detection means has performed a predetermined operation on said object image with the aid of said operation and input means;
  a second step in which said POI search means extracts extracting a POI category or POI information from said operated object image;
  a third step for searching for an applicable POI with reference to said POI database; and
  a fourth step for displaying a POI searched by said POI search means on the map image displayed on said display means,
  wherein said display means displays as an object image group an object image for each POI category adjacent to a display area in which the map image is displayed;
  said operation and input means includes operation means for selecting, as said predetermined operation, said object image for which a search is desired from said object image group, and dropping said object image on the map image displayed on said display means; and
  said first step includes a process for detecting operation on said object image with the aid of said operation means.

14. The method for inputting a POI search condition according to claim 13, wherein:
  the operation means for dropping said object image onto the map image displayed on said display means includes operation means for dragging and dropping the object image for which said search is desired; and
  said first step includes a process for detecting operation on said object image with the aid of said operation means.

15. The method for inputting a POI search condition according to claim 13, wherein:
  said operation means has operation means for clicking said object image in order to set the number of POIs to be searched; and
  said first step includes a process for detecting the number of clicks of the object image performed by said operation means.

16. The method for inputting a POI search condition according to claim 15, wherein:
  said object image is text or a pictograph;
  said operation and input means includes operation means for selecting, as said predetermined operation, said object image for which a search is desired, and dropping said object image on the map image displayed on said display means; and
  said first step includes a process for detecting operation on the object image.

17. The method for inputting a POI search condition according to claim 16, wherein:
the operation means for dropping said object image onto the map image displayed on said display means includes operation means for copying and pasting the object image for which said search is desired; and
said first step detects operation on said object image performed by said operation means.

18. A method for displaying guidance to a point of interest (POI) in a map display system composed of a terminal device having display means for displaying a map image, and a route search server having a POI database; the method characterized in that: said map display system comprises operation and input means for performing a predetermined operation on an object image that includes a POI category or POI information; object image operation detection means for detecting operation on said object image; means for setting a search starting point for determining a starting point of a route search; POI search means for extracting the POI category or POI information from said operated object image, referencing said POI database, and searching for a POI; and route search means for searching for a route from a search starting point determined by the means for setting search starting point to said searched POI; the method comprising:
a first step for detecting that said object image operation detection has performed a predetermined operation on said object image with the aid of said operation and input means;
a second step for extracting a POI category or POI information from said operated object image;
a third step for searching for an applicable POI with reference to said POI database;
a fourth step in which said route search means searches for a route from a search starting point determined by said means for setting search starting point to said searched POI; and
a fifth step for moving said object image at a predetermined speed along said searched route from said search starting point to said searched POI on the map image displayed on said display means, and displaying the POI,
wherein said display means displays as an object image group an object image for each POI category adjacent to a display area in which the map image is displayed;
said operation and input means includes operation means for selecting, as said predetermined operation, said object image for which a search is desired from said object image group, and dropping said object image on the map image displayed on said display means; and
said first step includes a process for detecting operation on said object image with the aid of said operation means.

19. The map display system according to claim 18, wherein:
the operation means for dropping said object image onto the map image displayed on said display means includes operation means for dragging and dropping the object image for which said search is desired; and
said object image operation detection means detects operation on said object image with the aid of said operation means.

20. The method for displaying guidance to a POI according to claim 18, wherein:
said operation means has operation means for clicking said object image in order to set the number of POIs to be searched; and
said first step includes a process for detecting operation on said object image with the aid of said operation means.

21. The method for displaying guidance to a POI according to claim 20, wherein:
said object image is text or a pictograph;
said operation and input means includes operation means for selecting, as said predetermined operation, said object image for which a search is desired, and dropping said object image on the map image displayed on said display means; and
said first step includes a process for detecting operation on the object image.

22. The method for displaying guidance to a POI according to claim 21, wherein:
the operation means for dropping said object image onto the map image displayed on said display means includes operation means for copying and pasting the object image for which said search is desired; and
said first step detects operation on said object image performed by said operation means.

23. The method for displaying guidance to a POI according to claim 18, further comprising:
said method for displaying guidance to a POI further comprises a step in which said means for setting search starting point determines the coordinate on the map screen where said object image is dropped to be the search starting point.

24. The method for displaying guidance to a POI according to claim 18, wherein said map display system further comprises positioning means for positioning the current location, and said method for displaying guidance to a POI further comprising:
a step in which said means for setting search starting point determines as the search starting point the center coordinate of the map image displayed on said display means, or the current location positioned by said positioning means.

25. A terminal device connected to a route search server for transmitting searched point of interest (POI) information to the terminal device, the device having a POI database and POI search means for extracting a POI category or the POI information from object information transmitted from the terminal device, referencing said POI database, and searching for a POI, said terminal device comprising:
display means for displaying a map image;
operation and input means for performing a predetermined operation on an object image having a POI category or POI information; and
object image operation detection means for detecting operation on said object image; wherein
said object image operation detection means transmits information of the object image to said route search server when a predetermined operation performed on said object image is detected by said operation and input means; and
said display means displays the POI on the map image on the basis of POI information received from said route search server,
wherein said display means displays as an object image group an object image for each POI category adjacent to a display area in which the map image is displayed,
said operation and input means includes operation means for selecting, as said predetermined operation, said object image for which a search is desired from said object image group, and dropping said object image on the map image displayed on said display means, and
said object image operation detection means detects operation on said object image with the aid of said operation means.

26. A terminal device connected to a route search server for transmitting to said terminal device searched point of interest (POI) information and route guidance to the POI from a search starting point, the device having a POI database; POI search means for extracting the POI category or POI information from object information transmitted from the terminal device, referencing said POI database, and searching for a POI; and route search means for searching for a route to said searched POI from a search starting point transmitted from the terminal device, said terminal device comprising:

- display means for displaying a map image;
- operation and input means for performing a predetermined operation on an object image having a POI category or POI information;
- object image operation detection means for detecting operation on said object image; and
- means for setting search starting point for determining the starting point of a route search; wherein the object image operation detection means detects said predetermined operation performed on said object image with the aid of said operation and input means, whereupon information of the object image is transmitted to said route search server as information of the search starting point determined by said means for setting search starting point; and said display means moves said object image at a predetermined speed along said searched route from said search starting point to said searched POI on the map image on the basis of the route guidance and the POI information received from said route search server, and displays the POI, wherein said display means displays as an object image group an object image for each POI category adjacent to a display area in which the map image is displayed, said operation and input means includes operation means for selecting, as said predetermined operation, said object image for which a search is desired from said object image group, and dropping said object image on the map image displayed on said display means, and said object image operation detection means detects operation on said object image with the aid of said operation means.

* * * * *